UNITED STATES PATENT OFFICE.

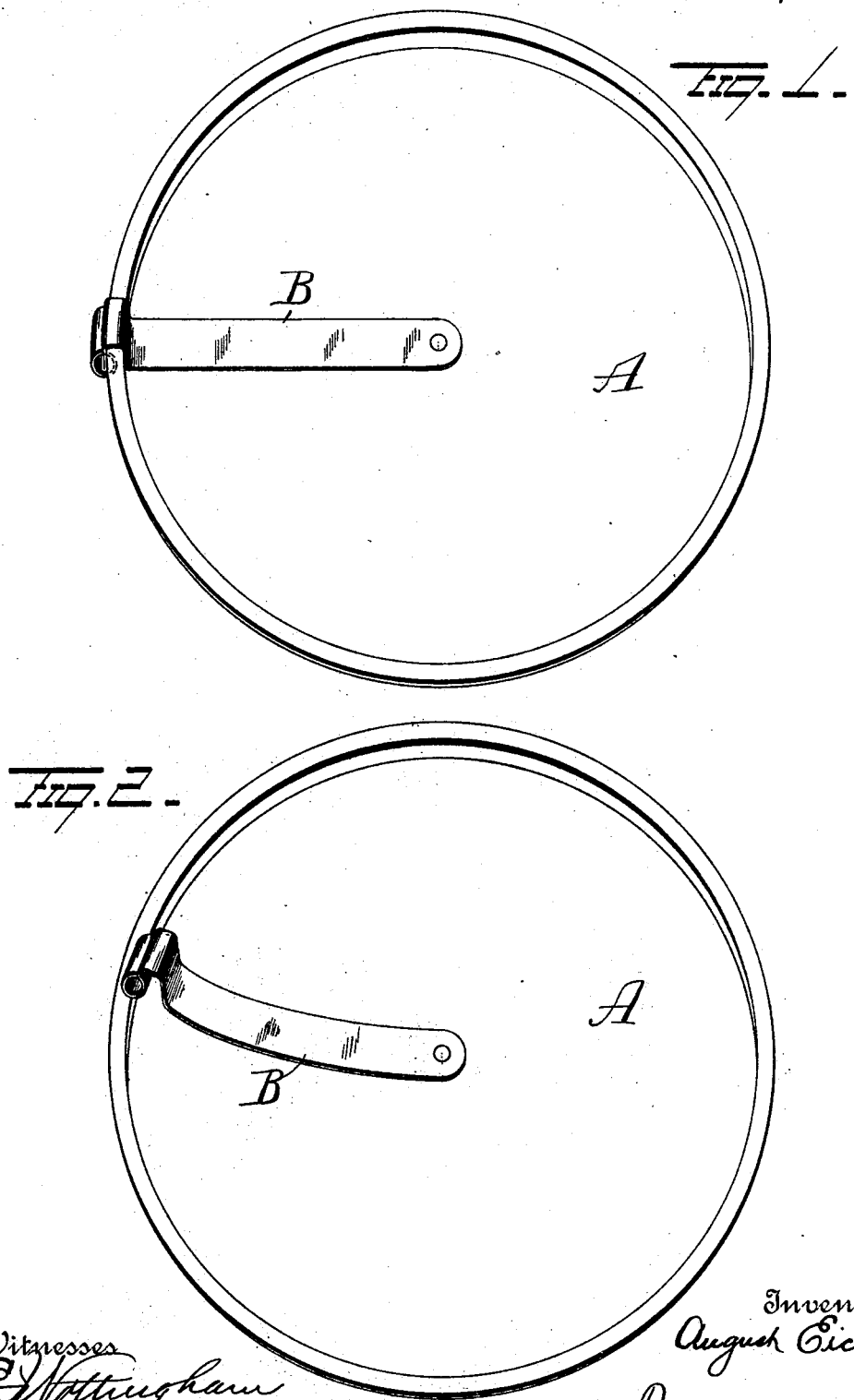

AUGUST EICHE, OF LINCOLN, NEBRASKA.

PASTRY-TIN.

SPECIFICATION forming part of Letters Patent No. 513,991, dated February 6, 1894.

Application filed June 28, 1893. Serial No. 479,046. (No model.)

*To all whom it may concern:*

Be it known that I, AUGUST EICHE, of Lincoln, in the county of Lancaster and State of Nebraska, have invented certain new and useful Improvements in Pastry-Tins; and I do hereby declare the following to be a full, clear, and exact description of the invention, such as will enable others skilled in the art to which it appertains to make and use the same.

My invention relates to an improvement in pans, and particularly to that class known as pie plates or cake pans. Heretofore pans have been provided with a knife or cutter, by means of which the article therein baked can be loosened from the sides and bottom preparatory to removal. These cutters have usually been made of sheet metal, bent to conform to the shape of the pan, one end being pivotally secured at the center of the pan, while the remaining portion of the cutter passes along the bottom of the pan, thence up the side thereof and under the outer edge or rim where it is locked against vertical displacement. In other forms the sheet metal cutter is doubled on itself, one half resting inside of the pan, while the remaining portion rests against the bottom thereof, both ends being pivoted to the center of said pan by a single rivet.

From the foregoing it will be observed that the cutters are adapted to be moved around the entire surface of the pan, and separate the pie or cake from the pan, thus permitting of its removal.

The present invention consists of a pan having a cutter pivoted at one end to the center of pan, its opposite or free end bent around the rim forming a catch adapted normally to hold the cutter in place and when released permits the cutter to fly up by its elasticity and elevate the article baked therein after the same has been loosened from the pan, and it further consists in the parts and combinations of parts as will be hereinafter more fully described and pointed out in the claims.

In the accompanying drawings, Figure 1 represents a perspective view of my improvement, and Fig. 2 is a similar view showing the free end of the cutter elevated from the pan.

A represents a pie or cake pan, and B the knife or cutter, which latter is preferably constructed of flat spring metal, one end of which is pivotally secured to the center of the pan or plate A, while its opposite end is bent over and under the side edge or rim of the pan A, and finally terminating in a loop, by means of which the knife or cutter B is rotated when it is desired to loosen a cake, pie or other article baked in said pan.

The knife or cutter B rests snugly against the bottom and sides of the pan A and is held in such position by the catch at the looped end of the knife or cutter, said looped end being so bent as to slightly project underneath the overhanging edge of the pan A forming the catch above referred to. Thus it will be seen that the knife or cutter can be revolved when desired without any danger of its being removed out of engagement with the rim of said plate or pan.

After the pie, cake or other article baked in the plate or pan has been thoroughly loosened therefrom, it can be removed by simply forcing the looped end of the knife or cutter B out of engagement with the under side of the overhanging edge of the pan or plate A, which operation causes the knife or cutter B to immediately spring upwardly, which in turn elevates the article contained therein. The cutter is normally bent to rest at an inclination and hence as soon as the catch is released it springs upwardly and carries with it one edge of the pie or cake, after which the article can easily be transferred to a plate without danger of breaking.

It is evident that changes in the construction and relative arrangement of the several parts might be made without avoiding my invention and hence I would have it understood that do not restrict myself to the particular construction and arrangement of parts shown and described, but, Having fully described my invention, what I claim as new, and desire to secure by Letters Patent, is—

1. A new article of manufacture, consisting of a plate or pan, a spring metal knife or cutter pivotally secured at one end to the plate or pan and provided at its opposite end with a catch adapted to take under the rim of the plate or pan, substantially as set forth.

2. A new article of manufacture, consisting of a plate or pan, a spring metal knife or cutter pivotally secured at one end to the plate or pan and provided at its opposite end with a catch adapted to take under the rim of the plate or pan, and a loop or handle located adjacent to said catch, substantially as set forth.

3. A new article of manufacture consisting of a plate or pan, a spring metal knife or cutter pivotally secured at one end to the center of said plate or pan, and resting normally in an inclined position, the opposite end being provided with a catch adapted to engage the under side of the rim of the plate or pan, substantially as set forth.

In testimony whereof I have signed this specification in the presence of two subscribing witnesses.

AUGUST EICHE.

Witnesses:
A. F. LAMBERTON,
H. J. WHITMORE.